Dec. 22, 1931.   B. FORD   1,837,361

PRIMARY ELECTRIC BATTERY

Filed Feb. 9, 1928

WITNESS:

INVENTOR
Bruce Ford
BY
Augustus B. Stoughton
ATTORNEY.

Patented Dec. 22, 1931

1,837,361

UNITED STATES PATENT OFFICE

BRUCE FORD, OF PHILADELPHIA, PENNSYLVANIA

PRIMARY ELECTRIC BATTERY

Application filed February 9, 1928. Serial No. 253,236.

The present invention relates to a septum for insertion between the depolarizing element and the zinc element of a primary battery, and objects of the present invention are to provide a durable, reliable and efficient septum which improves the operation, generally, of the battery in which it is employed.

Generally stated, a septum of the invention is a unitary structure, is conductive and nonporous, and is electrolytically inert, and sufficiently flexible to conform to surfaces to which it is contacted to give good electrical conductivity.

Figure 1:
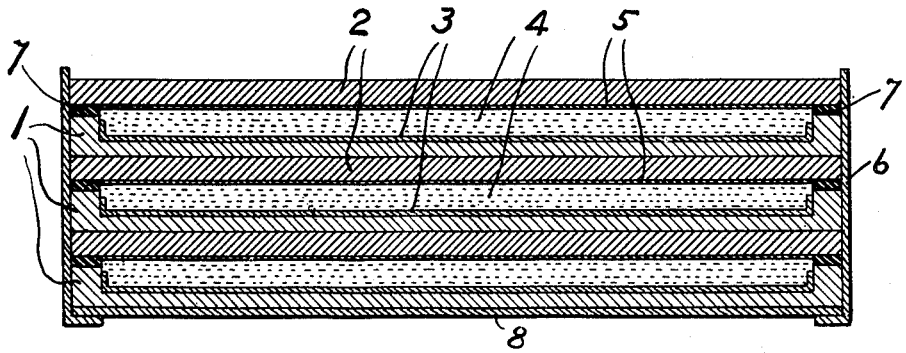
Figure 2:
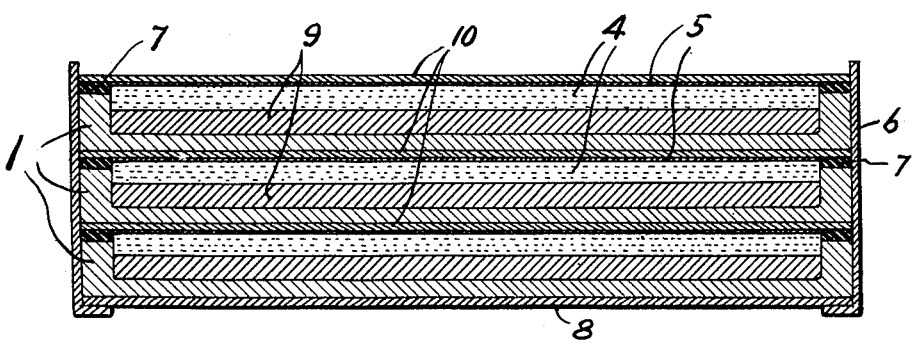

Other objects of the invention as well as the invention itself will be more fully understood from the following description at the end of which the invention will be claimed, and a description will be given in connection with the accompanying drawings forming part hereof and in which Figure 1 is a diagrammatic transverse sectional view of a portion of a primary battery having embodied therein a septum of the invention, and Fig. 2 is a similar view illustrating a modification in which the zinc and depolarizing elements are inverted with respect to the septum.

In the drawings 1 is the septum and referring more particularly to Fig. 1, 2 is the depolarizing element or positive electrode, for example, of manganese dioxide, carbon and graphite. 3 is the zinc element or negative electrode, 4 is the electrolyte paste, as of starch paste, sal ammoniac or ammonium chloride, and 5 is a sheet of paper. 6 is an envelope or casing in which the parts are wrapped. Gaskets or washers, 7, of, for example, paraffined paper material prevent short circuits, and a metallic end plate 8 serves for a terminal for attachment of battery connection. There is nothing particularly new in the parts so far referred to but the septum 1 embodies the present invention. It is a unitary structure which can be handled as such. It is conductive and non porous and it is electrolytically inert. The septum 1 is an admixture of graphite and rubber. The term rubber includes such material as is known in the trade and dealt in under the name latex. The term graphite includes carbon or a mixture of carbon and graphite. The septum is prepared by baking the admixture. The septum is the product resulting from mixing graphite and rubber cement to the consistency of stiff dough and then baking the mass. The septum is shown as dish or cup shaped but the shape is not important in all cases. The septum is conveniently prepared by dissolving rubber in a solvent, as benzol, to which is added divided carbon or graphite, or both, and baking the mass in a mold until the solvent is driven off. Rubber latex may be employed instead of dissolved rubber, in which event during the baking process, the water of the latex is evaporated.

The construction and arrangement illustrated in Fig. 2 are as above described except that the depolarizing block or positive element 9 is arranged inside of the cup, and the zinc negative element 10 is arranged outside of the cup in the stack or assemblage.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. A septum for insertion between the depolarizing and zinc elements of adjacent cells of a primary battery comprising a unitary structure consisting of an admixture of graphite and rubber.

2. A septum for insertion between the depolarizing and zinc elements of adjacent cells of a primary battery comprising a unitary structure consisting of a baked admixture of graphite and rubber.

3. A septum for insertion between the electrodes of adjacent cells of a primary battery comprising a unitary structure consisting of an admixture of graphite and rubber.

4. A septum for insertion between the electrodes of adjacent cells of a primary battery comprising a unitary structure consisting of a baked admixture of graphite and rubber.

BRUCE FORD.